July 24, 1956 R. H. ANDRESEN ET AL 2,756,080
ROTARY SEAL AND CLUTCH ASSEMBLY
Filed July 31, 1953 2 Sheets-Sheet 1
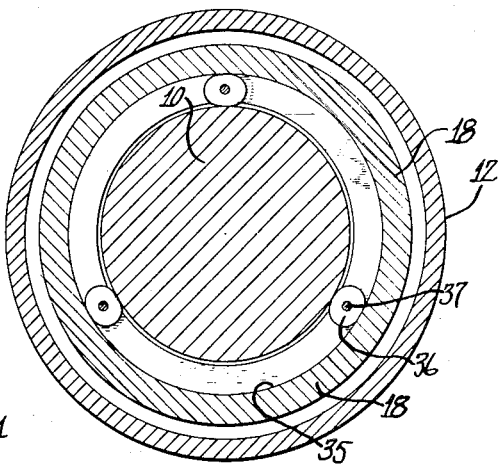
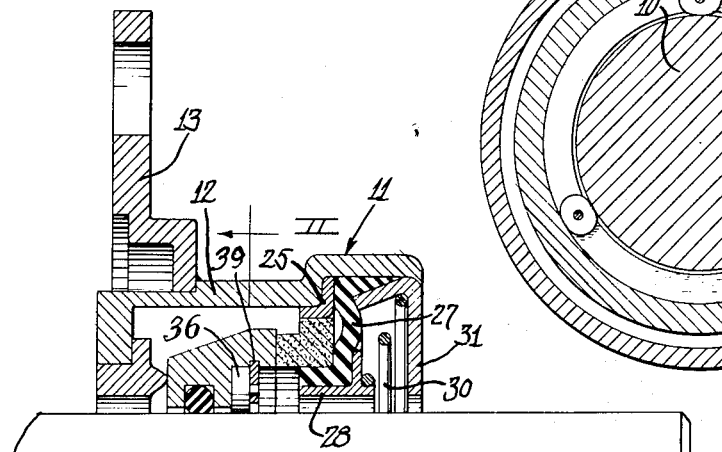
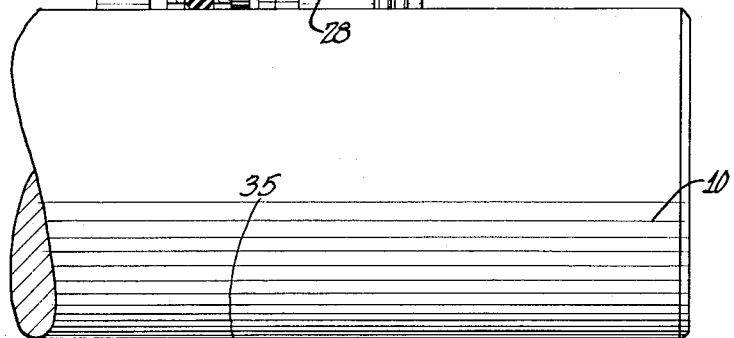
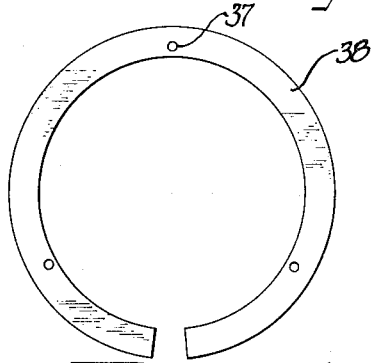
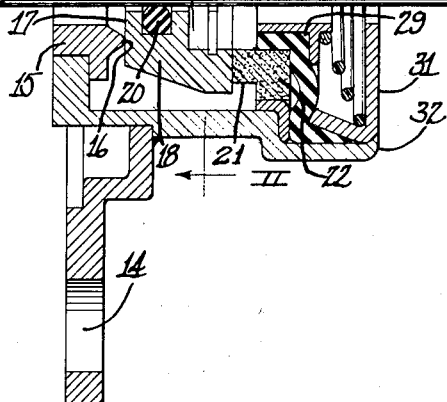
Inventors
Raymond H. Andresen
Hilmar A. Andresen
Attys

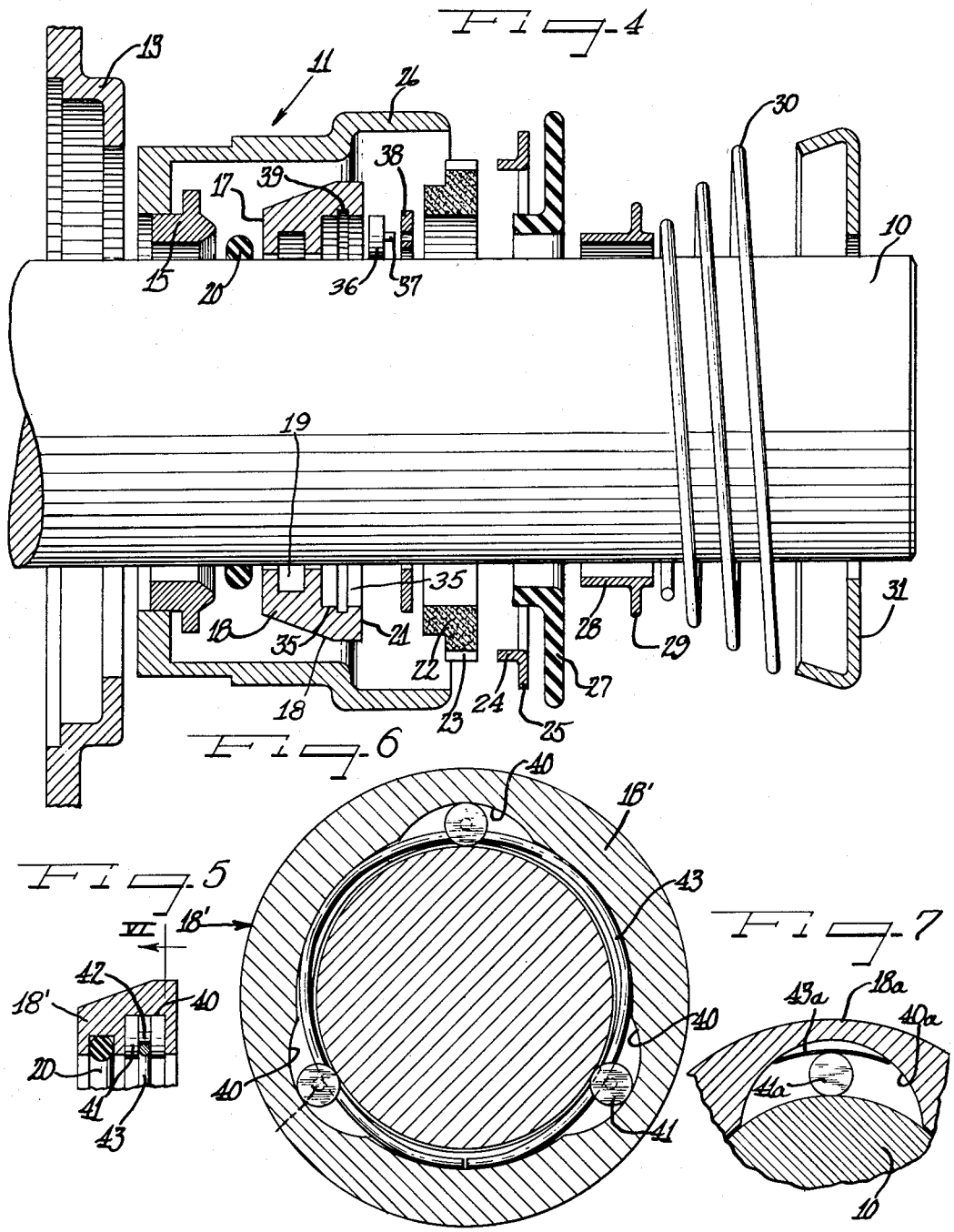

United States Patent Office 2,756,080
Patented July 24, 1956

2,756,080

ROTARY SEAL AND CLUTCH ASSEMBLY

Raymond H. Andresen and Hilmar A. Andresen, Chicago, Ill., assignors to Gits Bros. Mfg. Co., Chicago, Ill., a corporation of Illinois Application July 31, 1953, Serial No. 371,562

1 Claim. (Cl. 286—11)

This invention relates to a self-contained seal type drive unit embodying, as a component thereof, a shaft clutch mechanism.

The clutch subject matter hereof is adapted for use in a cartridge self-contained seal unit of the type disclosed in co-pending patent application, Serial No. 371,697 filed July 31, 1953.

In previous seal units the spring loading of the seal internally of the unit has required coaction of a part of the unit with an external surface or shoulder in order to pre-load the unit for effective use as a seal.

Our invention relates to an improved unit wherein no such internal coaction of the unit with outside means is required in order to render the unit effective and more particularly to the provision in the unit of shaft clutch means which is at all times spring loaded in position for effective engagement with the shaft.

An object of this invention is to provide a self-contained drive seal unit which is at all times internally spring loaded without requiring coaction with external parts and which includes shaft clutch means maintained in shaft receiving position by the pre-loading means of the unit.

Still other objects of this invention is to provide various forms of clutch mechanism especially adapted for use in a self-contained pre-load drive seal unit of the aforementioned type.

In accordance with the general features of this invention there is provided in a shaft seal structure, a unitary cartridge drive seal unit comprising an annular ring including rigid end seal faces maintained at all times under predetermined spring load, a resilient rubber-like ring confined in the annular ring between the end faces for engagement with a shaft projected therethrough, and shaft engaging clutch means carried by the ring and maintained in shaft receiving position by the spring load applied to the end seal faces.

Other features of the invention relates to different forms of clutch means retained under spring tension in the rubber sealing ring assembly of the drive seal unit.

Other objects and features of this invention may more fully appear from the following detailed description taken in connection with the accompanying drawings which illustrate several embodiments thereof and in which—

Figure 1 is a vertical sectional view through a seal unit having clutch means embodying the features of this invention and showing the same applied to a shaft;

Figure 2 is a vertical cross-sectional view taken on the line II—II of Figure 1 looking in the direction indicated by the arrows;

Figure 3 is a detail view of a split spring ring for carrying the clutch rollers shown in Figure 1;

Figure 4 is an exploded sectional view corresponding to Figure 1;

Figure 5 is a fragmentary sectional view through the rubber seal carrying annular ring showing a modified form of clutch means;

Figure 6 is an enlarged cross-sectional view taken on the line VI—VI of Figure 5 looking in the direction indicated by the arrows; and Figure 7 is a fragmentary sectional view similar to a portion of Figure 6 but showing a still further modified form of spring urged clutching roller.

As shown on the drawings:

The reference character 10 designates generally a rotary shaft to be sealed off against the flow of oil or lubricant therealong and on which is disposed a seal unit, designated generally by the reference character 11, embodying the features of this invention.

The unit 11 includes an annular metal housing 12 having suitably secured or connected to it in an integral manner a radial flange 13 provided with bolt holes 14 (Fig. 1). This flange is adapted to be detachably secured to a housing or the like from which the shaft emanates, such, for example, as a pump housing or the like.

One end of the annular housing 12 has press fitted into it a thrust or abutment ring 15 having an annular surface or edge 16 adapted to bear against a machined end face 17 of an annular seal ring 18. The ring 18 is made of metal and is grooved at 19 on its internal periphery to receive an annular rubber-like shaft engaging sealing ring 20. This ring may be made of any suitable resilient synthetic rubber-like material, such, for example, as "neoprene" or the like.

The metal ring 18 also has a second machined radial end face 21 spaced from but parallel to end face 17. The rubber ring 20 is disposed in a plane between the two end faces 17 and 21.

The end face 21 is engaged by an abutment ring 22 which has diametrically opposite notches 23 receiving projections 24 on a metal retaining ring 25 press fitted into an enlargement 26 of the housing 12. The ring 22 may be made of any suitable material, such, for example, as a carbon composition, and is fixedly held against rotation by the ring 25 which is secured to the housing.

The ring 22, however, is movable axially under the impelling force of a resilient annular diaphragm 27 which may be made of any suitable resilient rubber-like material, such, as example, "neoprene." The diaphragm is, in turn, carried upon a rigid metal ring 28 which has a radial flange 29 engaged by one end of a coiled compression spring 30 disposed between the ring 28 and a flanged spring retainer ring 31. The retainer ring 31 is adapted to be held in the housing 12 by the peened edge 32 on the enlargement 26 of the housing.

It will be appreciated that the spring 30 for pre-loading the unit may be predetermined to apply any given pressure in accordance with the particular application. This spring is the motivating force for maintaining the parts of the unit in position under spring load and also distorts the diaphragm 27 from the condition shown in Figure 4 to that shown in Figure 1 wherein the diaphragm is in sealing engagement with both the housing enlargement 11 and the carbon abutment ring 22.

From the foregoing, it is clear that rotary seals are provided at the end faces 17 and 21, a tight seal is provided by the ring 20 with the shaft, and seals are provided by the diaphragm 27 between the housing and the diaphragm and between the diaphragm and the abutment ring 22.

Our invention is concerned with providing in this same drive seal unit a shaft clutch which is also maintained under the spring load of the seal so as to be at all times in shaft engaging position.

In the first form of the clutch shown in Figures 1, 2 and 3, it will be observed that one end of the metal ring 18 is recessed at 35 to accommodate a plurality of circumferentially spaced elliptical rollers 36 (Fig. 2), each of which is rotatably carried on a pin 37 secured to a split ring 38 which encircles the shaft 10 and is common to all of the rollers 36. The split ring or band 38 is snapped into a groove 39 in the ring 18 inside of recess 35 but has a loose fit so it can rotate and allow clutching or locking engagement of the rollers with the shaft.

The split resilient ring 38 tends to urge the elliptical rollers 36 into engagement with the shaft. Upon turning of the shaft in either direction, the elliptical rollers are slightly turned wedging them between the shaft 10 and the surface of recess 35 in the metal ring 18 thereby establishing a clutch drive between the shaft and seal unit 18.

In the rotation of the unit 18, it bears against the spring urged carbon abutment ring 22 and also against the abutment ring 15 which may be made of bronze, brass or the like.

In Figures 5 and 6, we have shown a modification of the invention wherein the metal annular seal ring 18', which carries the rubber drive ring 20, has a slightly different form of clutch mechanism. In this form of the invention, the ring 18' is provided with a plurality of circumferentially spaced arcuate or cam-shaped recessed surfaces 40 in each of which is disposed a clutch roller 41. Each roller 41 is made of two sections held together by a central pin 42 which rollingly engages the surface of a split ring 43 common to all of the rollers. This split ring at all times urges the rollers radially outwardly against the cam or arcuate surfaces 40. The rollers are so arranged as to also engage the surface of the shaft 10. Hence, upon rotation of the shaft in either direction the clutch rollers 41 are wedged into clutching or driving engagement with the shaft.

In Figure 7, we have shown still another form of clutch similar to that of Figure 6 wherein the metal ring member 18a has arcuate or cam-shaped recesses 40a similar to the recesses 40 about the shaft 10. In each of the recesses is a clutch roller 41a which is urged into clutching engagement with the shaft 10 by a spring 43a between the surface of the recess and the roller. In other words, each roller 41a has a separate spring 43a for spring urging it into clutching engagement with the shaft 10.

It will be understood that except for the differences noted above the modifications operate in the same manner as the first described form of the invention.

We claim as our invention:

For use in a shaft seal structure, a unitary cartridge drive seal unit comprising an annular ring including rigid end seal faces, a resilient drive ring confined in said annular ring between said end faces projecting radially inwardly therefrom into a shaft receiving and frictional engaging position and shaft clutch means in said annular ring between its end faces including wedging rollers movable upon rotation of the shaft into wedged driving positions in said annular ring, said rollers being elliptical in shape and being carried on a split resilient ring movable with the rollers when they are moved into wedging positions.

References Cited in the file of this patent

UNITED STATES PATENTS

| 539,129 | Hargraves | May 14, 1895 |
| 1,029,663 | Bowersock | June 18, 1912 |
| 1,054,149 | Tebbets | Feb. 25, 1913 |
| 1,639,279 | Winkle | Aug. 27, 1927 |
| 1,788,891 | Runge | Jan. 13, 1931 |
| 2,037,144 | Olson | Apr. 14, 1936 |
| 2,069,377 | Matthiessen | Feb. 2, 1937 |
| 2,270,466 | Nash | Jan. 20, 1942 |
| 2,444,714 | Voytech | July 6, 1948 |
| 2,639,198 | Kirkham | May 19, 1953 |
| 2,672,360 | Chambers et al. | Mar. 16, 1954 |

FOREIGN PATENTS

| 473,951 | Canada | May 29, 1951 |
| 588,471 | Great Britain | May 22, 1947 |